US009148400B2

(12) United States Patent
Duggisetty et al.

(10) Patent No.: US 9,148,400 B2
(45) Date of Patent: Sep. 29, 2015

(54) AUTOMATIC DETECTION OF AN END NODE BEHIND A PHONE ON A COMPUTER NETWORK

(75) Inventors: Sudheer Duggisetty, Karnataka (IN); Manikantan Krishnamurthy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 13/541,236

(22) Filed: Jul. 3, 2012

(65) Prior Publication Data

US 2013/0272160 A1    Oct. 17, 2013

(30) Foreign Application Priority Data

Apr. 12, 2012 (IN) .......................... 1485/CHE/2012

(51) Int. Cl.
*H04L 29/12* (2006.01)
*G06F 15/173* (2006.01)

(52) U.S. Cl.
CPC ........ *H04L 61/103* (2013.01); *G06F 15/17356* (2013.01)

(58) Field of Classification Search
CPC ..................... G06F 15/17356; H04L 61/103
See application file for complete search history.

(56) References Cited

U.S. PATENT DOCUMENTS

| 7,562,159 | B2 | 7/2009 | Chen et al. |
| 7,673,021 | B2 | 3/2010 | Tasker et al. |
| 7,908,379 | B2 | 3/2011 | Droz et al. |
| 2001/0029536 | A1* | 10/2001 | Valentine et al. ............. 709/224 |
| 2006/0002311 | A1* | 1/2006 | Iwanaga et al. ............... 370/254 |
| 2006/0274774 | A1* | 12/2006 | Srinivasan et al. ............ 370/420 |
| 2007/0047546 | A1* | 3/2007 | Deguchi et al. ............... 370/390 |
| 2007/0248085 | A1* | 10/2007 | Volpano ........................ 370/389 |
| 2008/0008183 | A1* | 1/2008 | Takagaki et al. .............. 370/392 |
| 2008/0101240 | A1* | 5/2008 | Rohilla et al. ................ 370/236 |
| 2008/0219207 | A1* | 9/2008 | Chen et al. .................... 370/328 |
| 2008/0253380 | A1* | 10/2008 | Cazares et al. ........... 370/395.53 |
| 2009/0232139 | A1* | 9/2009 | Kelley ........................... 370/392 |
| 2010/0027420 | A1* | 2/2010 | Smith ........................... 370/235 |
| 2011/0078332 | A1 | 3/2011 | Poon |
| 2011/0222544 | A1* | 9/2011 | Medina et al. ................ 370/392 |
| 2011/0231574 | A1* | 9/2011 | Saunderson et al. .......... 709/245 |

OTHER PUBLICATIONS

"LLDP-MED and Cisco Discovery Protocol", Cisco Systems; 2006.

* cited by examiner

*Primary Examiner* — Ajay Cattungal

(74) *Attorney, Agent, or Firm* — Hewlett-Packard Patent Department

(57) ABSTRACT

Provided is a method of automatically detecting an end node behind a phone on a computer network. Media access control (MAC) address of an end node is determined, wherein the end node is coupled to a phone and the phone is coupled to a switch on a computer network. It is also determined whether the MAC address of the end node is recognized on a port of a switch on the computer network. If the MAC address is recognized on a port of a switch, a list of MAC addresses recognized on the port is obtained. If the list has two MAC addresses, the MAC address of the end node from one of the two MAC addresses is determined.

16 Claims, 3 Drawing Sheets

AUTOMATIC DETECTION OF AN END NODE BEHIND A PHONE ON A COMPUTER NETWORK

CLAIM FOR PRIORITY

The present application claims priority under 35 U.S.C 119 (a)-(d) to Indian Patent application number 1485/CHE/2012, filed on Apr. 12, 2012, which is incorporated by reference herein in its entirety.

BACKGROUND

A network node ("node") is an addressable device connected to a computer network. Some examples include a modem, hub, and switch. In addition, if the node is a computer, it is often called a "host". For instance, a personal computer (PC), server, printer, or phone may act as a host. Typically, the nodes present in a computer network are identifiable through a network management application.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned earlier, typically, the nodes present in a computer network can be identified through a network management application. However, there may be instances when a network node is not identifiable since it is behind another network device (node). This may happen in the case of an end node. (An end node is an individual network device (for example, a computer) which may be on the periphery of a network.)

Proposed is a system and method which automatically detects an end node in a computer network. Specifically, the proposed embodiments discover an end node where the end node is a personal computer which is connected behind a phone (for instance, a Voice over Internet Protocol (VoIP) phone or IP phone). The phone in turn is connected to another node (such as, a switch) of the computer network.

Figure 1:
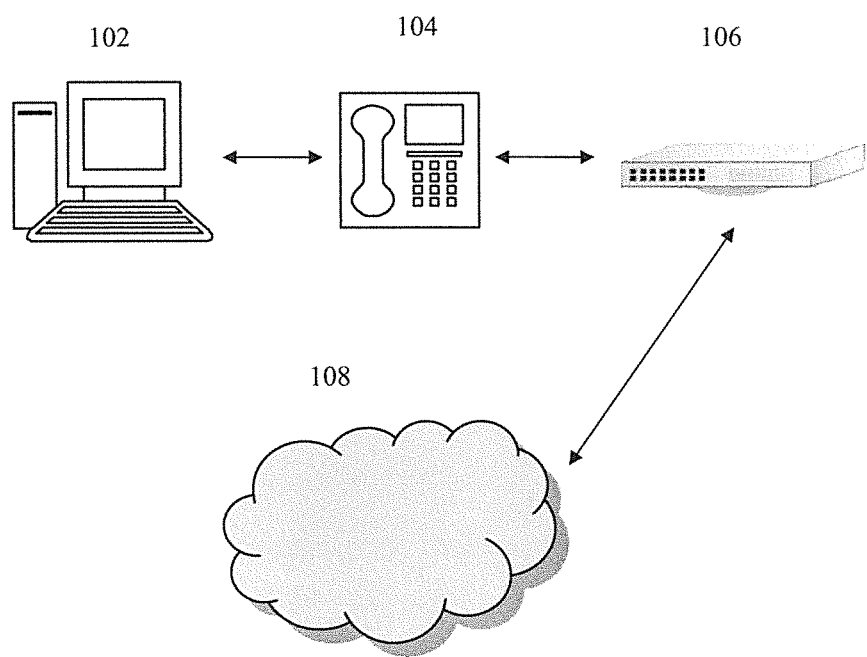
FIG. 1 illustrates an example computer network for automatic detection of an end node behind a phone on a computer network, according to an embodiment.

FIG. 1 illustrates an example computer network for automatic detection of an end node behind a phone on a computer network, according to an embodiment.

Referring to FIG. 1, computer network 100 comprises a computer 102 that is communicatively coupled to an IP phone 104. The IP phone 104 is communicatively coupled to a switch 106, which in turn may be coupled to another network 108, such as the internet, through a router (not illustrated) or another appropriate network device.

Computer 102 may be a personal computer (PC) (for example, a desktop computer, a notebook computer, a net book, etc.), a touchpad, computer server, a mobile phone, a personal digital assistant (PDA), and the like. In an example, computer 102 is an end node which is communicatively coupled to a port on an IP phone 104.

IP phone 104 also known as a VoIP phone or soft phone is based on VoIP technologies that allow telephone calls to be made over an IP network such as the internet. IP phone 104 may follow the Link Layer Discovery Protocol for Media Endpoint Devices [LLDP-MED], which extends the network device discovery capabilities of LLDP to media endpoint devices (such as a phone). In an example, IP phone 104 is communicatively coupled to a port on the switch 106.

Switch 106 is a computer networking device that connects network segments or network devices. In an embodiment, switch 106 connects the IP phone 104 with the internet 108 through a router. Switch 106 may have one or a plurality of ports.

It may be noted that although a single computer 102, IP phone 104 and switch 106 have been illustrated in FIG. 1, the actual number of these devices may vary in a computer network that implements the proposed solution.

Figure 2:
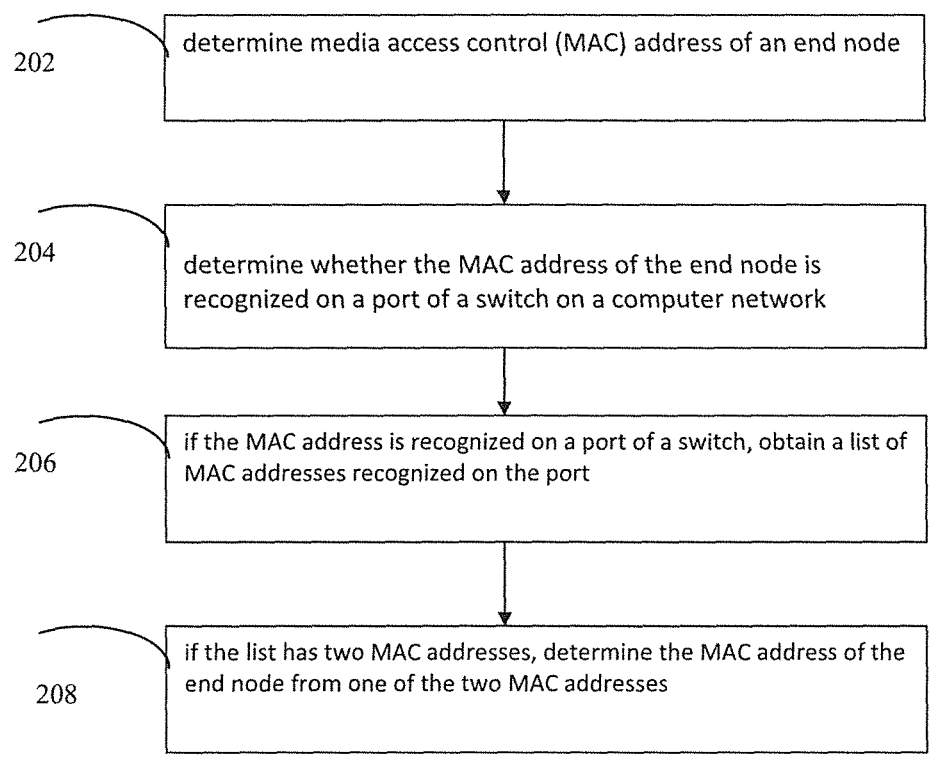
FIG. 2 shows a flow chart of a method of automatic detection of an end node behind a phone on a computer network, according to an embodiment.

FIG. 2 shows a flow chart of a method of automatic detection of an end node behind a phone on a computer network, according to an embodiment.

In an example, an end node is coupled to a phone, which in turn is coupled to a switch. The end node is not directly connected to a switch on the computer network. All the aforesaid devices may be on a computer network, which may have other network nodes (for example, switches etc.) as well. In addition, the computer network may be connected to another network, such as an intranet or the internet.

At block 202, IP address of an end node (for example, computer 102) on a computer network is used to obtain media access control (MAC) address of the end node. The IP address of an end node can be provided by a user or obtained through other means.

In an example, the Address Resolution Protocol (ARP) table of the subnet gateway switch 106 is used to obtain the MAC address of an end node from the IP address. An ARP table associates a layer 3 (Network layer) address (such as an IP address) with a layer 2 (Data Link layer) address (MAC address). And a MAC address of a node can be obtained from an ARP table if the IP address is available.

At block 204, once the MAC address of the end node is obtained, the Bridge MIB (Management Information Base) is used to determine whether the MAC address of the end node is recognized on any port of a switch(s) on the computer network.

If the end node is recognized on any port of a switch on the computer network, a list of virtual local area networks (VLANs) configured on the switch is obtained. Then a determination is made, for each VLAN, whether the MAC address is recognized on any port.

At block 206, if the MAC address is recognized on a port, a list of MAC addresses recognized on the port is obtained.

At block 208, once the list of MAC addresses is obtained, it is ascertained whether the list has two MAC addresses for the same port. If the list has two MAC addresses for the same port, it is likely that one of the two MAC addresses is a MAC address of an end node and the other MAC address is of an IP phone.

LLDP and LLDP-MED MIBs (Management Information Base) are checked to determine which of the two MAC addresses (from a port) is of an IP phone. Once the MAC address of the IP phone is identified, the MAC address of an end node is determined by eliminating the MAC address of the IP phone from the list.

Figure 3:
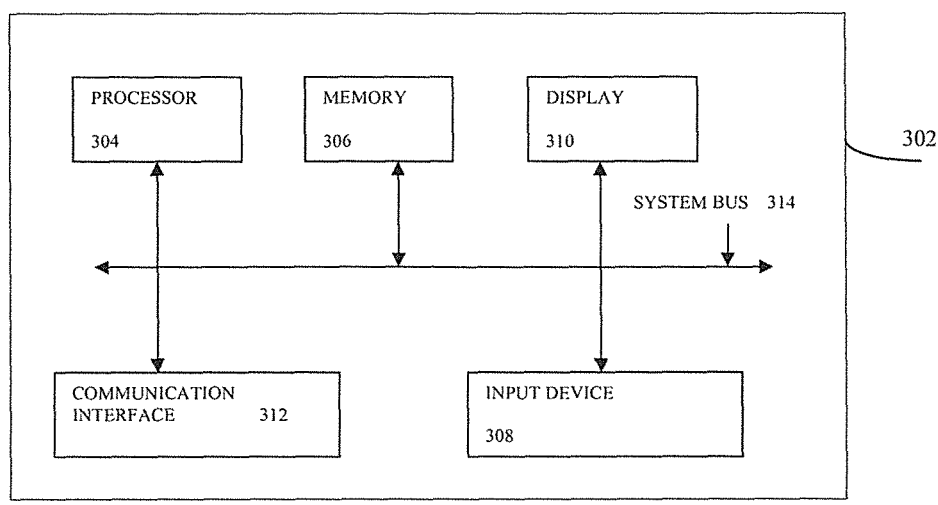
FIG. 3 illustrates a computer for implementing an embodiment of the proposed solution, according to an example.

FIG. 3 illustrates a computer 302 that may be used for implementing an embodiment of the proposed solution, according to an example.

Computer 302 may be a personal computer (PC) (for example, a desktop computer, a notebook computer, a net book, etc.), a touchpad, computer server, a mobile phone, a personal digital assistant (PDA), and the like.

Computer 302 may include a processor 304 (for executing machine readable instructions), a memory 306 (for storing machine readable instructions), an input device 308, a display 310 and a communication interface 312. The aforesaid components may be coupled together through a system bus 314.

Processor 304 is arranged to execute machine readable instructions. The machine readable instructions may be in the form of a software program. In an example, processor 304 executes machine readable instructions to: determine a media access control (MAC) address of the end node, wherein the end node is coupled to the phone and the phone is coupled to a switch on the computer network; determine whether the MAC address of the end node is recognized on a port of a switch on the computer network; if the MAC address is recognized on a port of a switch, obtain a list of MAC addresses recognized on the port; and if the list has two MAC addresses, determine the MAC address of the end node from one of the two MAC addresses.

Memory 306 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc.

Input device 308 may be used to provide a user input to computer 302. Input device may include a keyboard, a mouse, a touch pad, a trackball, and the like.

Display device 310 may be any device that enables a user to receive visual feedback. For example, the display may be a liquid crystal display (LCD), a light-emitting diode (LED) display, a plasma display panel, a television, a computer monitor, and the like.

Communication interface 312 is used to communicate with an external device, such as a switch, router, a phone, etc. Communication interface 312 may be a software program, a hard ware, a firmware, or any combination thereof. Communication interface 312 may use a variety of communication technologies to enable communication between computer 302 and an external device. To provide a few non-limiting examples, communication interface may be an Ethernet card, a modem, an integrated services digital network ("ISDN") card, etc.

It would be appreciated that the system components depicted in FIG. 3 are for the purpose of illustration only and the actual components may vary depending on the computing system and architecture deployed for implementation of the present solution. The various components described above may be hosted on a single computing system or multiple computer systems, including servers, connected together through suitable means.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method to automatically detect an end node behind a phone on a computer network, comprising:

determining a media access control (MAC) address of the end node from an Internet Protocol (IP) address of the end node, wherein the end node is communicatively coupled to a port on the phone and the phone is communicatively coupled to a port on a switch in the computer network;

subsequent to determining the MAC address of the end node, determining whether the determined MAC address of the end node is recognized on a port of a switch on the computer network, wherein the determining of whether the MAC address of the end node is recognized on a port of the switch includes determining a list of virtual local area networks (VLANs) configured on the switch, and determining, for each VLAN, whether the MAC address is recognized on any port assigned to the VLAN;

if the MAC address is recognized on a port of the switch and the port is assigned to at least one of the VLANs, obtaining a list of MAC addresses recognized on the port; and if the list has two MAC addresses, determining the end node is connected to the at least one of the VLANs via the phone and via the port, wherein the IP address of the end node is received from a user or a computer system, and the MAC address of the end node is determined from the IP address received from the user or the computer system.

2. The method of claim 1, wherein the end node is a computer.

3. The method of claim 1, wherein the end node is not directly connected to the switch on the computer network.

4. The method of claim 1, wherein the phone is a Voice over Internet Protocol (VoIP) phone.

5. The method of claim 1, wherein the phone supports Link Layer Discovery Protocol for Media Endpoint Devices (LLDP-MED).

6. The method of claim 1, wherein the MAC address of the end node is obtained from the IP address of the end node.

7. A system to automatically detect an end node behind a phone on a computer network, comprising:

a processor;

a memory communicatively coupled to the processor, the memory comprising machine executable instructions that, when executed by the processor, cause the processor to:

determine a media access control (MAC) address of the end node from an Internet Protocol (IP) address of the end node, wherein the end node is communicatively coupled to a port on the phone and the phone is communicatively coupled to a port on a switch in the computer network;

subsequent to determining the MAC address of the end node, determine whether the determined MAC address of the end node is recognized on a port of a switch on the computer network, wherein to determine whether the MAC address of the end node is recognized on a port of the switch, the machine executable instructions cause the processor to:

determine a list of virtual local area networks (VLANs) configured on the switch, and determining, for each VLAN, whether the MAC address is recognized on any port assigned to the VLAN;

determine, for each VLAN, whether the MAC address is recognized on any port assigned to the VLAN;

if the MAC address is recognized on a port of the switch and the port is assigned to at least one of the VLANs, obtain a list of MAC addresses recognized on the port; and if the list has two MAC addresses, determine the end node is connected to the at least one of the VLANs via the phone and via the port, wherein the IP address of the end node is received from a user or a computer system, and the MAC address of the end node is determined from the IP address received from the user or the computer system.

8. The system of claim 7, wherein the end node is a computer.

9. The system of claim 7, wherein the phone is a Voice over Internet Protocol (VoIP) phone.

10. The system of claim 7, wherein the phone supports Link Layer Discovery Protocol for Media Endpoint Devices (LLDP-MED).

11. The system of claim 7, the end node is not directly connected to the switch on the computer network.

12. A non-transitory computer readable medium including machine executable instructions, the machine executable instructions when executed causes a computer to:

determine a media access control (MAC) address of an end node from an Internet Protocol (IP) address of the end node;

subsequent to determining the MAC address of the end node from the information provided by the user, determine whether the determined MAC address of the end node is recognized on a port of a switch by determining a list of virtual local area networks (VLANs) configured on the switch, and determining, for each VLAN, whether the MAC address is recognized on any port assigned to the VLAN;

if the MAC address is recognized on a port of the switch and the port is assigned to at least one of the VLANs, obtain a list of MAC addresses recognized on the port; and if the list has two MAC addresses, determine the end node is connected to the at least one of the VLANs via the phone and via the port, wherein the IP address of the end node is received from a user or a computer system, and the MAC address of the end node is determined from the IP address received from the user or the computer system.

13. The non-transitory computer readable medium of claim 12, wherein the end node is a computer.

14. The non-transitory computer readable medium of claim 12, wherein the phone is a Voice over Internet Protocol (VoIP) phone.

15. The non-transitory computer readable medium of claim 12, wherein the phone supports Link Layer Discovery Protocol for Media Endpoint Devices (LLDP-MED).

16. The non-transitory computer readable medium of claim 12, wherein the end node is not directly connected to the switch in the computer network.

* * * * *